United States Patent
He et al.

(10) Patent No.: US 10,447,792 B2
(45) Date of Patent: Oct. 15, 2019

(54) METHODS, APPARATUS, AND SYSTEMS FOR SENDING INFORMATION BASED ON USER INTERACTIONS

(71) Applicant: ALIBABA GROUP HOLDING LIMITED, George Town, Grand Cayman (KY)

(72) Inventors: Huimei He, Hangzhou (CN); Fengwei Wang, Hangzhou (CN); Dijun He, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 200 days.

(21) Appl. No.: 15/073,229

(22) Filed: Mar. 17, 2016

(65) Prior Publication Data

US 2016/0277479 A1    Sep. 22, 2016

(30) Foreign Application Priority Data

Mar. 19, 2015 (CN) .......................... 2015 1 0122749

(51) Int. Cl.
*G06F 15/16* (2006.01)
*H04L 29/08* (2006.01)

(52) U.S. Cl.
CPC .................. *H04L 67/22* (2013.01)

(58) Field of Classification Search
CPC ...................................................... H04L 67/22
USPC ............... 709/217–219, 227–229, 223–224
See application file for complete search history.

(56) References Cited

U.S. PATENT DOCUMENTS

| 4,472,801 A | 9/1984 | Huang |
| 5,689,642 A | 11/1997 | Harkins et al. |
| 5,920,700 A | 7/1999 | Gordon et al. |
| 5,991,302 A | 11/1999 | Berl et al. |
| 6,205,445 B1 | 3/2001 | Tokuyama |
| 6,732,273 B1 | 5/2004 | Byers |
| 6,959,265 B1 * | 10/2005 | Candela .............. G06F 11/3409 709/223 |
| 7,130,389 B1 | 10/2006 | Rodkey et al. |
| 9,223,849 B1 * | 12/2015 | Bilinski .................. H04L 67/22 |
| 2003/0084446 A1 | 5/2003 | Thurston et al. |

(Continued)

FOREIGN PATENT DOCUMENTS

CN 103167007 A 6/2013

OTHER PUBLICATIONS

PCT International Search Report and Written Opinion dated Jun. 16, 2016, issued in corresponding International Application No. PCT/US16/22872 (7 pages).

(Continued)

*Primary Examiner* — Bharat Barot
(74) *Attorney, Agent, or Firm* — Finnegan, Henderson, Farabow, Garrett & Dunner, LLP (57) ABSTRACT

An information sending method is provided. The method includes calculating a weight of an interaction setting between a first terminal device and a second terminal device, calculating a relational score based on the weight between the first terminal device and the second terminal device, the second terminal device being one or more second terminal devices, calculating a service index of the first terminal device based on the relational score, and sending information to the first terminal device based on the service index.

20 Claims, 5 Drawing Sheets

(56) References Cited

U.S. PATENT DOCUMENTS

| | | | |
|---|---|---|---|
| 2003/0158924 A1* | 8/2003 | DeLegge | H04L 41/5009 709/223 |
| 2006/0026191 A1 | 2/2006 | McSherry | |
| 2007/0253340 A1 | 11/2007 | Varney et al. | |
| 2008/0052407 A1 | 2/2008 | Baudino et al. | |
| 2009/0217178 A1 | 8/2009 | Niyogi et al. | |
| 2010/0076850 A1 | 3/2010 | Parekh et al. | |
| 2012/0330720 A1 | 12/2012 | Pickton et al. | |
| 2014/0122702 A1* | 5/2014 | Jung | H04L 67/22 709/224 |
| 2014/0181118 A1* | 6/2014 | Lee | G06F 17/30321 707/746 |
| 2016/0203146 A1* | 7/2016 | Moll | G06Q 50/26 707/741 |
| 2016/0371366 A1* | 12/2016 | Gao | G06F 17/30994 |

OTHER PUBLICATIONS

SIPO Chinese Search Report issued in corresponding Chinese Application No. 201510122749.8 dated Oct. 23, 2018, 2 pages.
SIPO First Chinese Office Action issued in corresponding Chinese Application No. 201510122749.8 dated Nov. 2, 2018, 14 pages.

* cited by examiner

METHODS, APPARATUS, AND SYSTEMS FOR SENDING INFORMATION BASED ON USER INTERACTIONS

CROSS REFERENCE TO RELATED APPLICATION

The present application claims the benefits of priority to Chinese Application No. 201510122749.8, filed on Mar. 19, 2015, the entire contents of which are incorporated herein by reference.

TECHNICAL FIELD

The present application relates to internet technologies, and more particularly, to methods, apparatus, and systems for sending information over the internet.

BACKGROUND

People nowadays receive enormous amount of information from the internet. Some of the processes are more active, such as searching for a specific term. Some of the processes are more passive, such as receiving notifications of recent news or new products on a cellphone.

In some present technologies, service providers determine the content and/or the timing of notifications sent to the users based on the users' service indices, which indicate how influential a particular user is with respect to other users. The service indices are quantitative indicators of users' impact factors. If the user, who first receives the notification, is an influential person, re-sends it to others, the receivers may consider the notification more reliable than one sent by someone unknown to him/her.

Current methods of determining the service indices based on times or frequencies of interaction among users can be inaccurate. This may result in ineffective delivery of sending notifications and the service providers may fail to achieve expected results.

SUMMARY

One aspect of the present disclosure is directed to an information sending method. The method includes calculating a weight of an interaction setting between a first terminal device and a second terminal device, calculating a relational score based on the weight between the first terminal device and the second terminal device, the second terminal device being one or more second terminal devices, calculating a service index of the first terminal device based on the relational score, and sending information to the first terminal device based on the service index.

Another aspect of the present disclosure is directed to an information sending apparatus. The apparatus includes a weight calculating unit configured to calculate a weight of an interaction setting between a first terminal device and a second terminal device, a score calculating unit configured to calculate a relational score based on the weight between the first terminal device and the second terminal device, the second terminal device being one or more second terminal devices, an index calculating unit configured to calculate a service index of the first terminal device based on the relational score, and an information sending unit configured to send information to the first terminal device based on the service index.

Another aspect of the present disclosure is directed to an information sending apparatus. The apparatus includes a processor and a memory storing instructions. The instructions, when executed by the processor, cause the processor to calculate a weight of an interaction setting between a first terminal device and a second terminal device, calculate a relational score based on the weight between the first terminal device and the second terminal device, the second terminal device being one or more second terminal devices, calculate a service index of the first terminal device based on the relational score, and send information to the first terminal device based on the service index.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Although terms "first", "second", "third" and the like may be adopted in the present application to describe various kinds of information, such information should not be limited by these terms. These terms are only used for distinguishing information of the same kind. For example, under the situation of not departing from the range of the present application, first information may also be called as second information. Similarly, second information may also be called as first information. Depending on the context, the word "if" which is used here can be explained as "while", "when" or "in response to determination."

Consistent with some embodiments of this disclosure, a terminal device may be used by a user and may be uniquely associated with the user's account. Accordingly, relations among the terminal devices and calculated features of the terminal devices may represent those of the users, e.g. an influence of user A on user B can be represented by an influence of user A's cellphone on user B's cellphone. In this disclosure, "user" and "terminal device" may be interchangeable terms.

Figure 1:
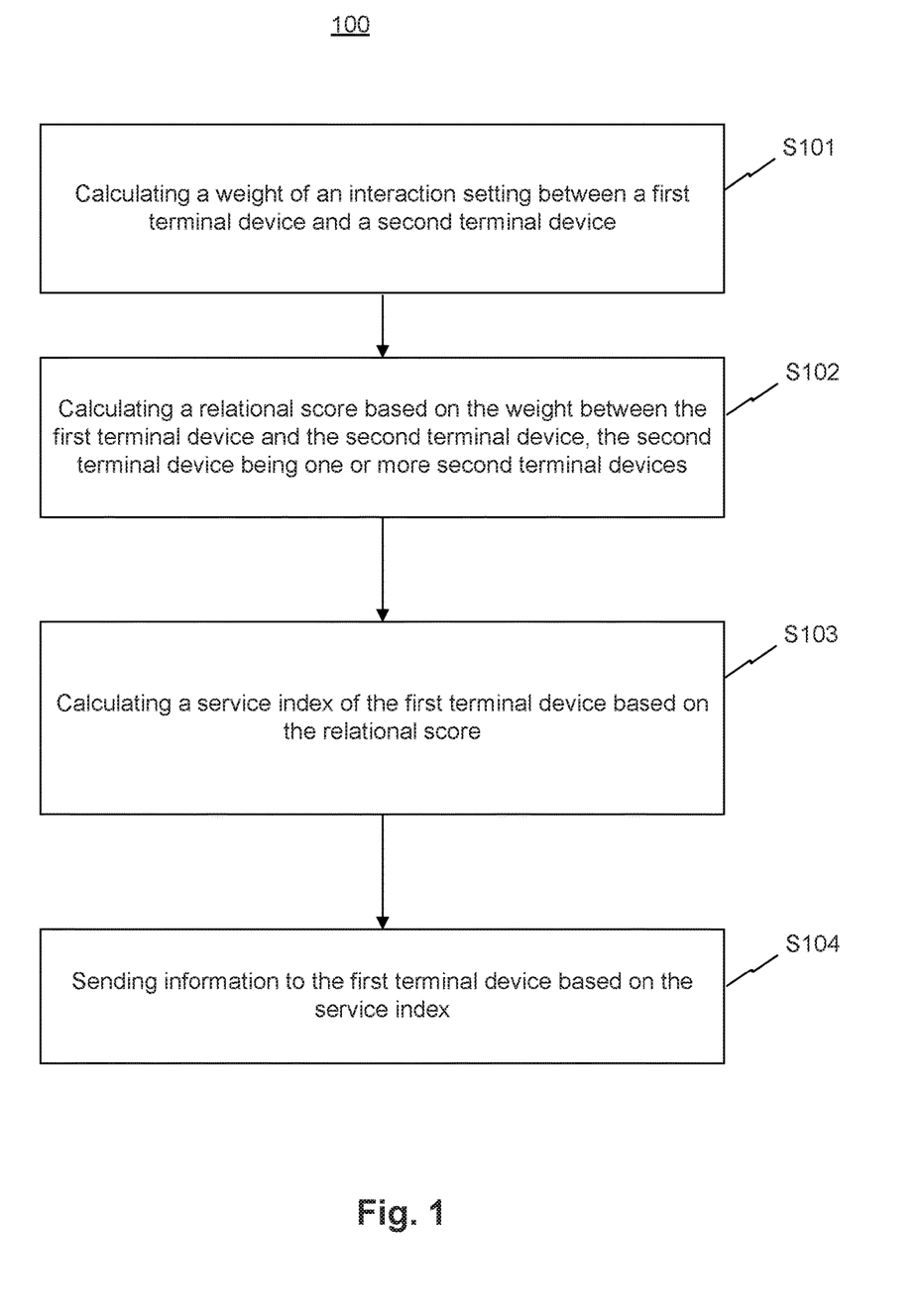
FIG. 1 is a flow diagram illustrating a method for sending information, according to an exemplary embodiment.

FIG. 1 is a flow diagram illustrating an information sending method 100, according to an exemplary embodiment. The method may be applied on a server and may include the following steps:

Step 101: calculating a weight of an interaction setting between a first terminal device and a second terminal device.

In some embodiments, a larger number of interaction settings for interactions among users and/or a higher interaction frequency among them may indicate that the users have a closer relationship and tend to influence each other more than others. Therefore, a service index of a user may be calculated according to the interaction settings of the users.

The interaction settings may be embodied in many forms. For example, a user may interact with another user through a social network or a user may perform interaction of fund transactions with another user through online banking. In different interaction settings, interaction behavior among users affects the service index differently. For example, the following interaction settings, in which a user performs fund transactions with another user, may affect service index differently. In a first scenario, a first user transfer fund to a second user. In a second scenario, a third user pay credit card balance on behalf of a fourth user. Each user uses his/her own terminal device to perform transactions. Although both interaction settings involve a fund transaction, they affect a calculation of a service index differently. In the former interaction setting, the fund transaction may relate to a seller-purchaser relationship, a financial aid relationship, a debit-credit relationship, or other relationships between the first user and the second user involved in the transaction and the first user influences the second user. In comparison, if a third user pays the credit card balance on behalf of a fourth user, it indicates that the third user and the fourth user have a closer relationship, and the influence of the third user on the fourth user is greater than the influence of the first user on the second user. Therefore, in this example, a weight of each interaction setting between the first user/terminal device and the second user/terminal device is used to quantize the interaction behavior among the users/terminal devices involved and to calculate a user service index.

In some embodiments, an interaction score is used to quantize an interaction behavior among users. For example, a logistic regression model may be used to calculate the interaction score, with a formula of the interaction score as follows:

$$f(x) = \frac{2}{1+e^{-ax}} - 1$$

x is an interaction variable between users, for example, a transfer amount or a number of transfers. a is a weight of the interaction setting. f(x) is the interaction score.

Figure 2:
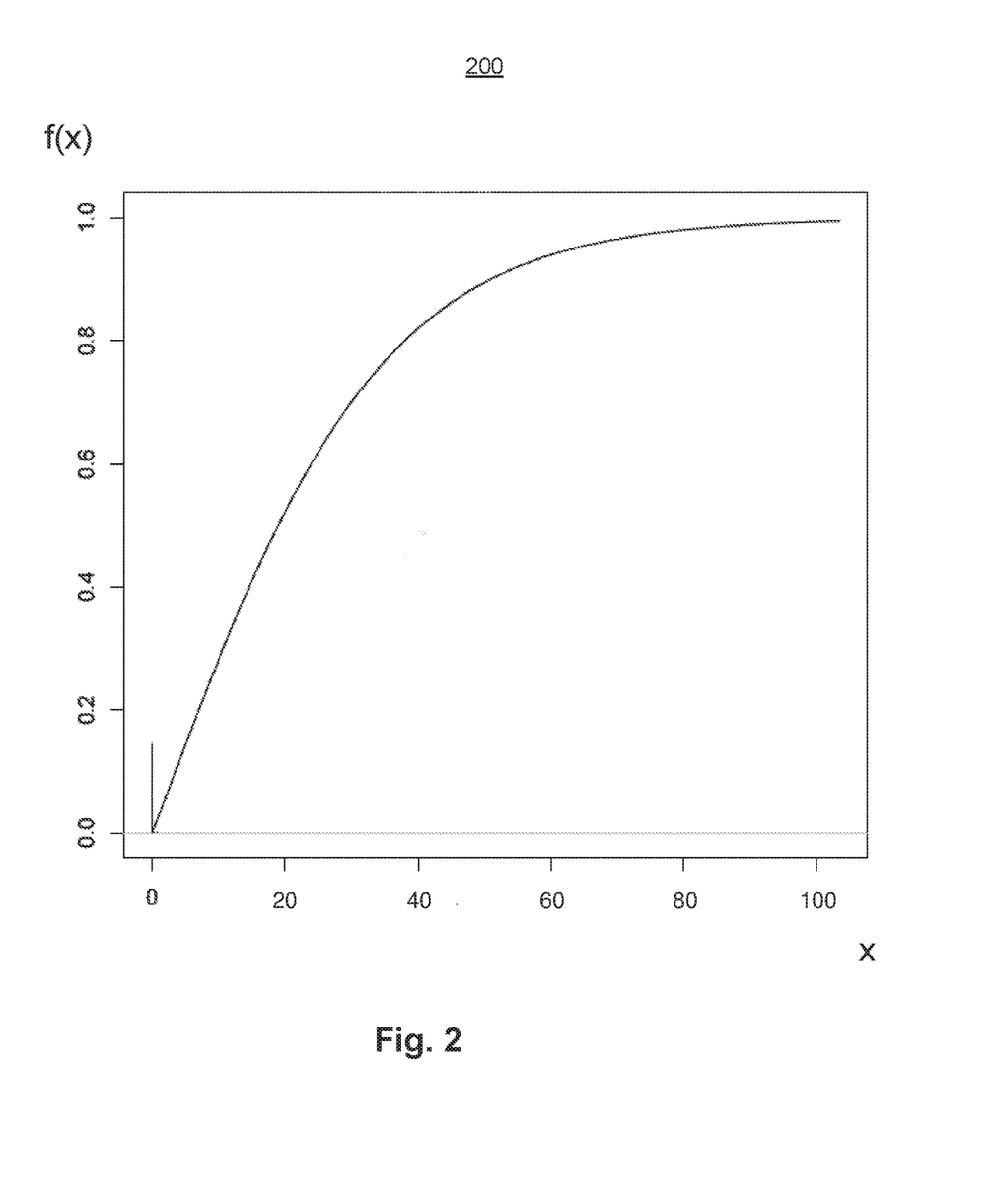
FIG. 2 is a graphical representation illustrating an interaction score, according to an exemplary embodiment.

FIG. 2 is a graphical representation 200 illustrating the interaction score f(x), according to an exemplary embodiment. x is the number of transfers, and it can be seen from FIG. 2 that, as x increases, the curve change of f(x) becomes smoother. As x increases, each time x is incremented by 1, the influence of x on the change in the interaction score f(x) decreases. For example, if an interaction score of one transfer of funds from a first user to a second user is 0.1, when the first user has transferred funds to the second user for 100 times, the first user transfers funds to the second user once more (the 101$^{st}$ transfer) and the interaction score may be increased by only 0.001 for this transfer. Therefore, in some embodiments with the foregoing calculation formula of the interaction score, when the value of x is the 99$^{th}$ percentile, a derivative of f(x) is 0.01 times the derivative of f(x) when the value of x is 0, that is:

$$\frac{f'(x_1)}{f'(0)} = 0.01$$

$x_1$ is equal to the 99$^{th}$ percentile of the interaction variable x. In this embodiment, this formula is an interaction setting weight calculation formula. The 99$^{th}$ percentile of the interaction variable x in different interaction settings may be calculated. Assuming that in the transfer interaction setting, the 99$^{th}$ percentile of the number of transfers x is 100, that is, $x_1$ is 100. It can be calculated according to the interaction setting weight calculation formula that the interaction setting weight a of the transfer interaction setting is 0.06. Assuming that in the interaction setting of credit card payment on behalf of the other user, the 99$^{th}$ percentile of the number of transfers x is 20, that is, $x_1$ is 20. It can be calculated according to the interaction setting weight calculation formula that the interaction setting weight a of the transfer interaction setting is 0.3. From this step, interaction setting weights corresponding to interaction settings may be calculated according to the interaction setting weight calculation formula.

Step 102: calculating a relational score based on the weight between the first terminal device and the second terminal device, the second terminal device being one or more second terminal devices.

In this step, for each first user/terminal device, relational scores of other users with respect to the first user are separately calculated.

Figure 3:
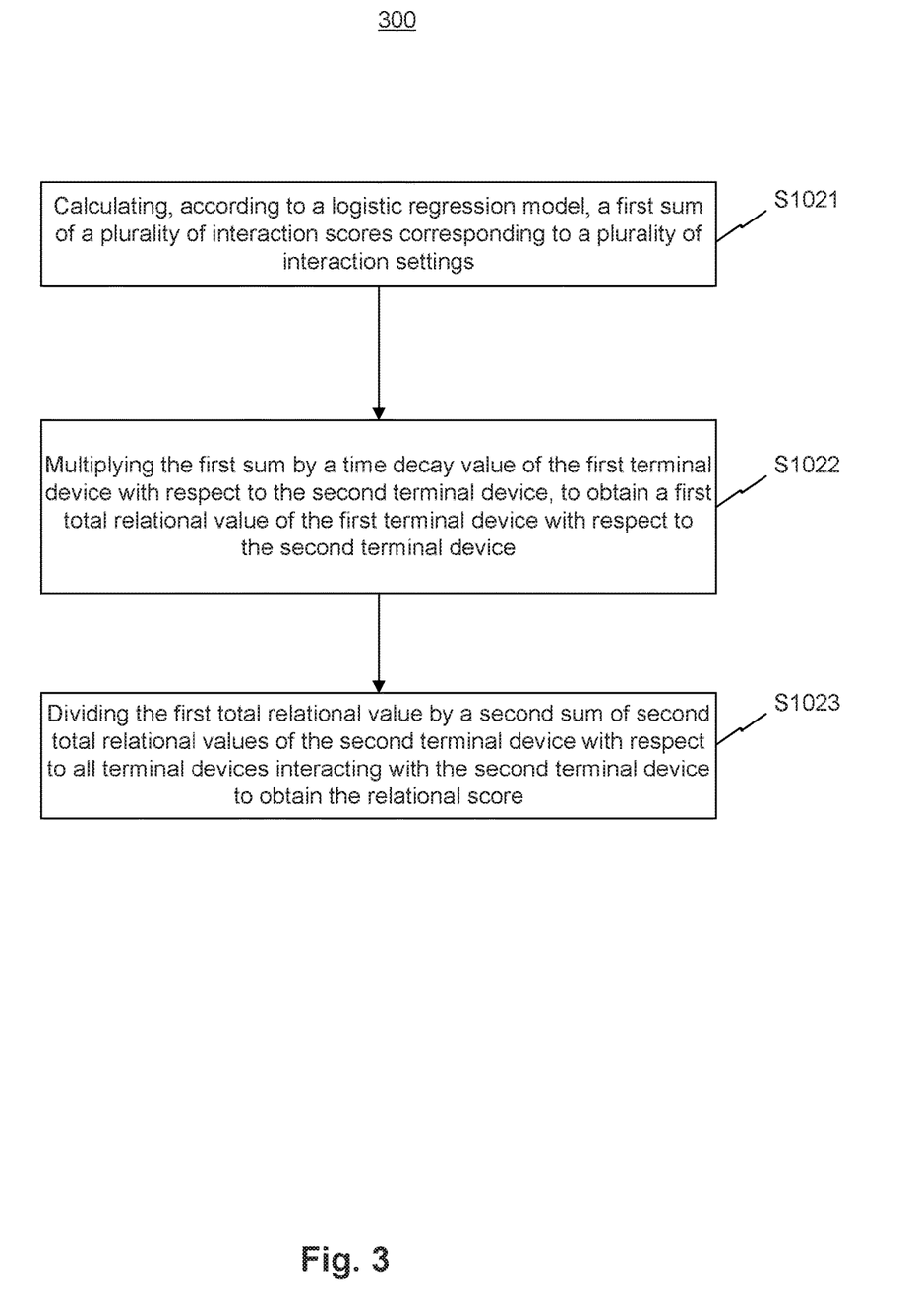
FIG. 3 is a flow diagram illustrating another method for sending information, according to an exemplary embodiment.

FIG. 3 is a flow diagram illustrating another method 300 for sending information, according to an exemplary embodiment. In some embodiments, Step 102 in FIG. 2 may comprise steps of method 300 shown in FIG. 3 and described below.

Step 1021: Calculating, according to a logistic regression model, a first sum of a plurality of interaction scores corresponding to a plurality of interaction settings between the second user and the first user.

In some embodiments, based on step 101, after the interaction setting weight corresponding to the interaction setting is obtained, a sum of interaction scores between the users in all interaction settings may be calculated according to the logistic regression model. $M_{BA}$ represents a first sum (summed over all interaction settings) of interaction scores f(x) of the second user with respect to the first user described above. $M_{BA}$ may be calculated based on the foregoing interaction score calculation formula, wherein $M_{BA} = \Sigma_{x=1}^{N} f_{BA}(x)$. N is the number of interaction settings in which interaction behaviors between a first user A and a second user B occur, x is an interaction variable, and $f_{BA}(x)$ is an interaction score of the second user B with respect to the first user A in a certain interaction setting. In one example, if the second user B transfers funds to the first user A for 20 times, and the first user A transfers funds to the second user B for 5 times, the number of interactions between the second user and the first user is 25 in this interaction setting and the value of the interaction variable x is 25. In some embodiments, an interaction score $f_{BA}(x)$ of the second user B with respect to the first user A is the same as an interaction score $f_{AB}(x)$ of the first user A with respect to the second user B.

Step 1022: multiplying the first sum by a time decay value of the first user A with respect to the second user B, to obtain a first total relational value of the first user A with respect to the second user B.

Based on step 1021, after the first sum of the interaction scores of the first user A with respect to the second user B is obtained, the first sum is multiplied by a time decay value of the first user A with respect to the second user B to obtain a product. In this embodiment, the obtained product is a first total relational value of the first user A with respect to the second user B.

In this embodiment, $MT_{BA}$ represents the first total relational value of the first user A with respect to the second user B and $$MT_{BA} = M_{BA} \times 2^{-\frac{t}{T}}.$$

$2^{31\ t/T}$ is the time decay value, T is a half-life period, the value of T may be set to 12, and t is the number of months since the last interaction behavior between the first user A and the second user B. If t=T, $$MT_{BA} = \frac{M_{BA}}{2}.$$

A total relational value of the second user B with respect to the first user A is the same as a total relational value of the first user A with respect to the second user B, that is, $MT_{AB}=MT_{BA}$.

Step 1023: dividing the first total relational value of the second user B with respect to first user A by a second sum of total relational values of the second user B with respect to all users/terminal devices interacting with the second user B to obtain the relational score. In this embodiment, $S_{BA}$ represents the relational score of the second user B with respect to the first user A:

$$S_{BA} = \frac{MT_{BA}}{\sum_{i=1}^{P} MT_{Bi}}$$

P is the total number of users interacting with the second user B.

The $S_{BA}$ may be used to quantize the influence of the second user B on the first user A. If B has 10 contacts including the first user A, B has different degrees of influence on the 10 contacts, and a service index of the second user B is 1, a sum of service indices of the second user B with respect to the 10 contacts should also be 1.

In step 102, according to method 300 shown in FIG. 3, relational scores of other users (including the second user) with respect to the first user may be calculated individually.

Step 103: calculating a service index of the first user/terminal device based on the relational scores.

Based on step 102, after the relational score of the at least one second user with respect to the first user is obtained, the service index of the first user may be calculated by iterations using a PageRank algorithm.

In this embodiment, a service index calculation formula as follows may be used:

$$W(A) = \frac{1-d}{h} + d \times \sum_{i=1}^{h} W(i) \times S_{iA}$$

W(i) is a service index of a user i, W(A) is the service index of user A, d is a damping coefficient in the PageRank algorithm, the value of d is 0.85, h is the number of users, and $S_{iA}$ is a relational score of user i with respect to user A. If there is no interaction behavior between user i and user A, the value of $S_{iA}$ is 0. Therefore, the foregoing service index calculation formula may also be expressed as follows:

$$W(A) = \frac{1-d}{h} + d \times \sum_{i=1}^{K} W(i) \times S_{iA}$$

K is the number of users, among the h users interacting with user A. In this step, according to the service index calculation formula, the service index of the first user A is calculated by means of iteration. First, the service index of each user is initialized to be the same, that is, service indices of all users are initialized to be 1/h. Then, iterative calculation is started, and the service index of the first user A is calculated according to relational scores of other users with respect to the first user A. In this embodiment, a developer may preset an iteration number for calculation of the user service index, and if a preset iteration number R is present, the iterative calculation is performed R times according to the service index calculation formula to obtain the service index of the first user. If no preset iteration number is present, an apparatus, e.g. a server, determines, after each iteration, whether service indices of all users meet a preset convergence condition. If the service indices of all users meet the preset convergence condition, the apparatus stops the iteration. The preset convergence condition may be set by the developer, for example, the preset convergence condition may be set as follows: a change in service indices of 99% of the users calculated in the current iteration relative to service indices calculated in last iteration is no greater than 1%, that is, the service indices of 99% of the users become stable.

Step 104: sending information to the first terminal device based on the service index.

Based on step 103, after the service index of each user is calculated, the server may send different information to users based on respective service indices. For example, a user with a higher service index is generally considered as influential, and during production promotion, information may be first sent to the user with a higher service index.

From the disclosure, a user service index may be calculated according to historical interaction behaviors between users, which can effectively improve the accuracy of calculation of the user service index, thereby improving the accuracy of information sending.

Corresponding to the embodiments of the methods for calculating the user service index, the present disclosure further provides an apparatus for calculating the user service index. The apparatus may be implemented by software, hardware, or a combination of software and hardware. For software, the apparatus for calculating a user service index of the present application may be a logical apparatus and may be formed by using a processor of a device in which the apparatus is located to read corresponding computer program instructions from a non-transitory computer-readable memory into a memory and execute the computer program instructions.

Figure 4:
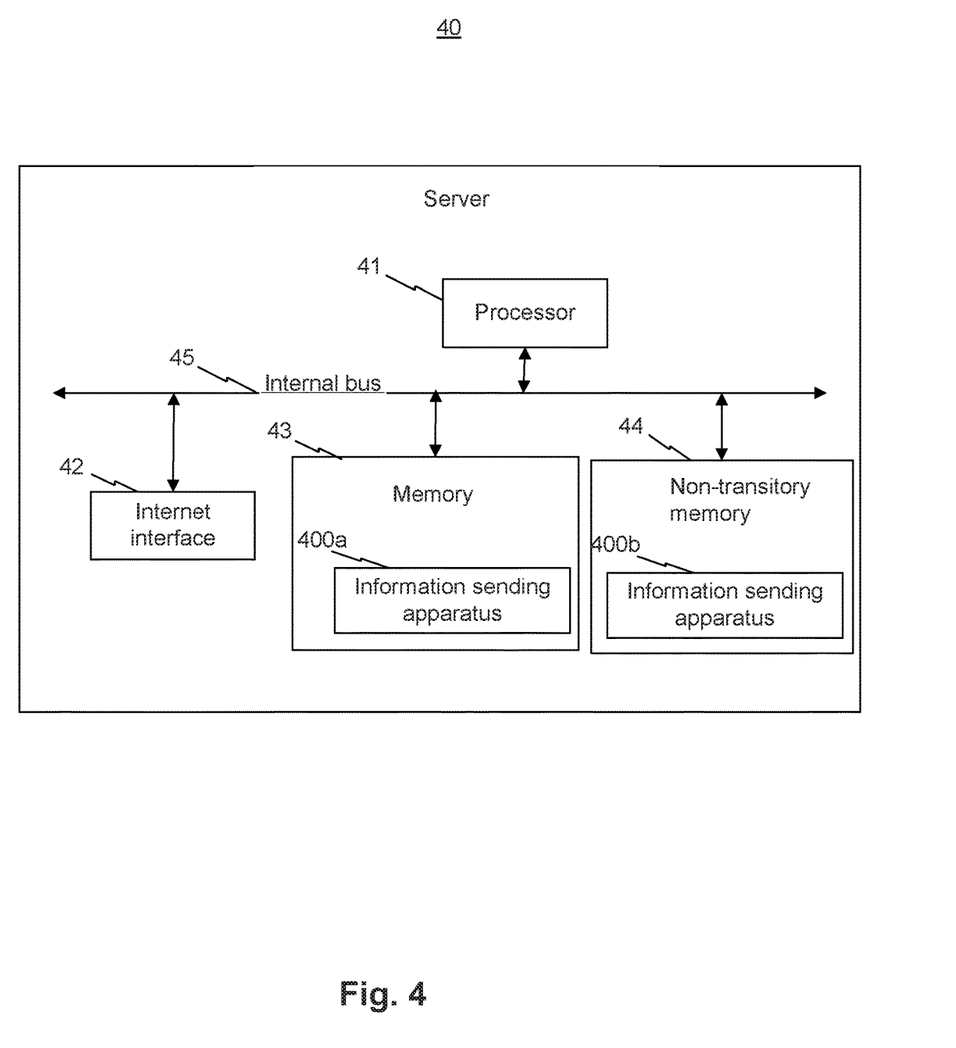
FIG. 4 is a block diagram illustrating an apparatus for sending information, according to an exemplary embodiment.

FIG. 4 is a block diagram illustrating an apparatus 40 for sending information, according to an exemplary embodiment. In some embodiments, the apparatus 40 is a server. The apparatus includes a processor 41, an internet interface 42, a memory 43, and a non-transitory memory 44 all connected with each other through an internal bus 45. The memory 43 may include an information sending apparatus 400a. The non-transitory memory 44 may include an information sending apparatus 400b. 400a and 400b may each be an information sending apparatus 400 described below.

Figure 5:
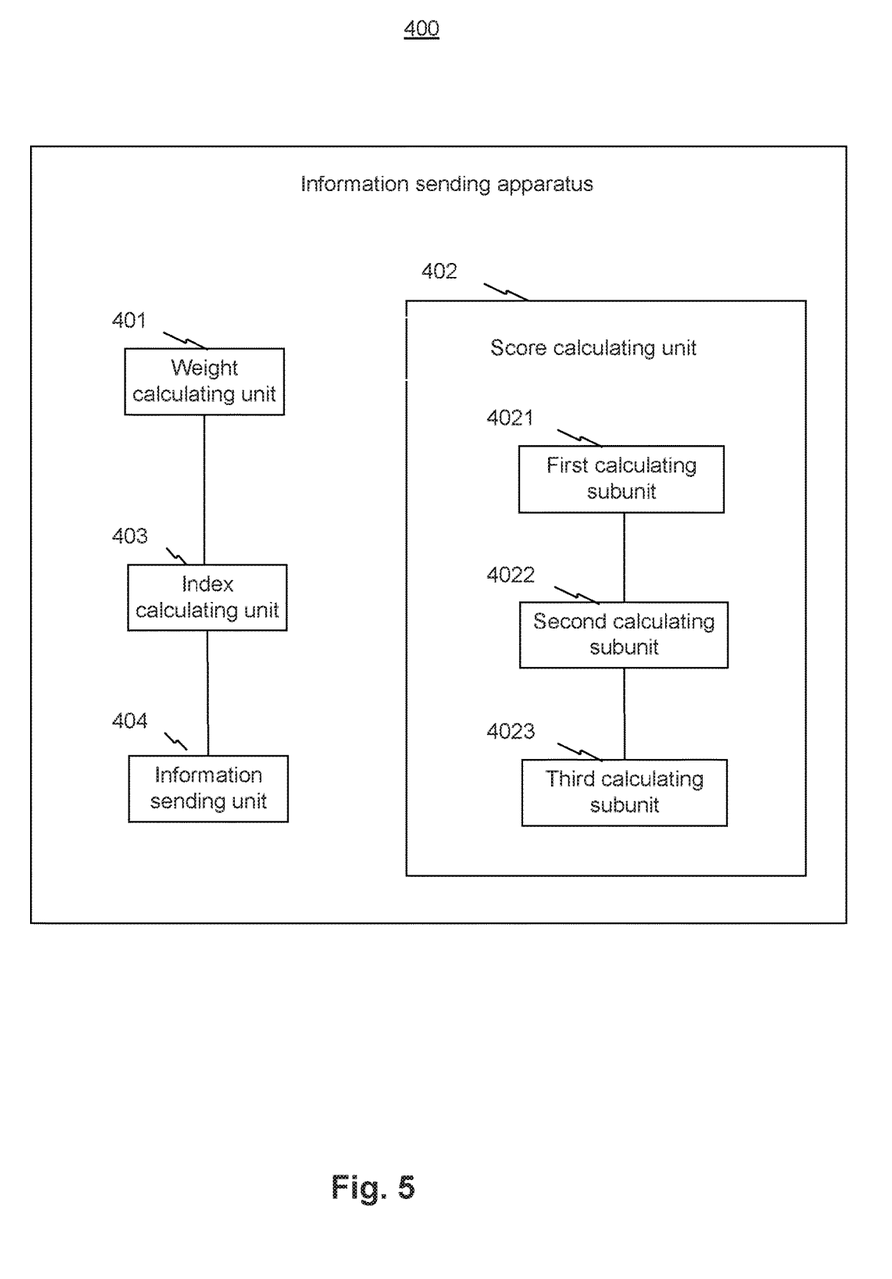
FIG. 5 is a block diagram illustrating another apparatus for sending information, according to an exemplary embodiment.

FIG. 5 is a block diagram illustrating another apparatus 400 for sending information, according to an exemplary embodiment. The apparatus 400 may be an information sending apparatus including a weight calculation unit 401, a score calculation unit 402, an index calculation unit 403, and an information sending unit 404. The score calculation unit 402 may further include a first calculation subunit 4021, a second calculation subunit 4022, and a third calculation subunit 4023.

The weight calculation unit 401 is configured to calculate a weight of an interaction setting between a first terminal device and a second terminal device.

The score calculation unit 402 is configured to calculate a relational score based on the weight between the first terminal device and the second terminal device, the second terminal device being one or more second terminal devices.

The index calculation unit 403 is configured to calculate a service index of the first terminal device based on the relational score.

The information sending unit 404 is configured to send information to the first terminal device based on the service index.

Further, the weight calculation unit 401 is configured to calculate the weight of the interaction setting between the first terminal device and the second terminal device according to a logistic regression model as described above.

The first calculation subunit 4021 is configured to calculate, according to the logistic regression model, a first sum of a plurality of interaction scores corresponding to a plurality of interaction settings.

The second calculation subunit 4022 is configured to multiply the first sum by a time decay value of the first terminal device with respect to the second terminal device, to obtain a first total relational value of the first terminal device with respect to the second terminal device.

The third calculation subunit 4023 is configured to divide the first total relational value by a second sum of second total relational values of the second terminal device with respect to all terminal devices interacting with the second terminal device to obtain the relational score.

Further, the index calculation unit 403 is configured to calculate the service index of the first terminal device based on iterations with a PageRank algorithm.

Further, the index calculating unit 403 is further configured to iterate for a number of times with the PageRank algorithm, if the number of times is preset, and iterate until all service indices of all terminal devices interacting with the first terminal device meet a preset convergence condition, if the number of times is not preset.

Details of specific implementation processes of functions and effects of the units in the foregoing apparatus are described above.

The specification has described methods, apparatus, and systems for sending information. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable storage medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. An information sending method performed by an apparatus, the method comprising:

calculating, by the apparatus, a weight of an interaction setting between a first terminal device and a second terminal device;

calculating a relational score based on the weight between the first terminal device and the second terminal device, the second terminal device being one or more second terminal devices;

calculating a service index of the first terminal device based on the relational score;

determining information to send based on the service index; and sending the determined information to the first terminal device.

2. The method of claim 1, wherein calculating the weight of the interaction setting between the first terminal device and the second terminal device comprises calculating the weight of the interaction setting between the first terminal device and the second terminal device according to a logistic regression model.

3. The method of claim 2, wherein calculating the at least one relational score based on the weight among the first terminal device and the at least one second terminal device comprises:

calculating, according to the logistic regression model, a first sum of a plurality of interaction scores corresponding to a plurality of interaction settings;

multiplying the first sum by a time decay value of the first terminal device with respect to the second terminal device, to obtain a first total relational value of the first terminal device with respect to the second terminal device; and dividing the first total relational value by a second sum of second total relational values of the second terminal device with respect to terminal devices interacting with the second terminal device to obtain the relational score.

4. The method of claim 1, wherein calculating the service index of the first terminal device based on the relational score comprises calculating the service index of the first terminal device based on iterations with a PageRank algorithm.

5. The method of claim 4, wherein calculating the service index of the first terminal device based on the iterations with the PageRank algorithm comprises:

iterating for a number of times with the PageRank algorithm, if the number of times is preset; and iterating until all service indices of all terminal devices interacting with the first terminal device meet a preset convergence condition, if the number of times is not preset.

6. An information sending apparatus, comprising:

a weight calculating unit configured to calculate a weight of an interaction setting between a first terminal device and a second terminal device;

a score calculating unit configured to calculate a relational score based on the weight between the first terminal device and the second terminal device, the second terminal device being one or more second terminal devices;

an index calculating unit configured to calculate a service index of the first terminal device based on the relational score; and an information sending unit configured to deteii iine what information to send based on the service index and to send the determined information to the first terminal device.

7. The apparatus of claim 6, wherein the weight calculating unit is further configured to calculate the weight of the interaction setting between the first terminal device and the second terminal device according to a logistic regression model.

8. The apparatus of claim 7, wherein the score calculating unit is further configured to:

calculate, according to the logistic regression model, a first sum of a plurality of interaction scores corresponding to a plurality of interaction settings;

multiply the first sum by a time decay value of the first terminal device with respect to the second terminal device, to obtain a first total relational value of the first terminal device with respect to the second terminal device; and divide the first total relational value by a second sum of second total relational values of the second terminal device with respect to terminal devices interacting with the second terminal device to obtain the relational score.

9. The apparatus of claim 6, wherein the index calculating unit is further configured to calculate the service index of the first terminal device based on iterations with a PageRank algorithm.

10. The apparatus of claim 9, wherein the index calculating unit is further configured to:

iterate for a number of times with the PageRank algorithm, if the number of times is preset; and iterate until all service indices of all terminal devices interacting with the first terminal device meet a preset convergence condition, if the number of times is not preset.

11. An information sending apparatus, comprising:

a memory configured to store a set of instructions;

a processor configured to execute the set of instructions to cause the information sending apparatus to:

calculate a weight of an interaction setting between a first terminal device and a second terminal device;

calculate a relational score based on the weight between the first terminal device and the second terminal device, the second terminal device being one or more second terminal devices;

calculate a service index of the first terminal device based on the relational score;

determine information to send based on the service index; and send the determined information to the first terminal device.

12. The apparatus of claim 11, wherein the processor is configured to execute the set of instructions to cause the information sending apparatus to calculate the weight of the interaction setting between the first terminal device and the second terminal device according to a logistic regression model.

13. The apparatus of claim 12, the processor is configured to execute the set of instructions to cause the information sending apparatus to:

calculate, according to the logistic regression model, a first sum of a plurality of interaction scores corresponding to a plurality of interaction settings;

multiply the first sum by a time decay value of the first terminal device with respect to the second terminal device, to obtain a first total relational value of the first terminal device with respect to the second terminal device; and divide the first total relational value by a second sum of second total relational values of the second terminal device with respect to terminal devices interacting with the second terminal device to obtain the relational score.

14. The apparatus of claim 11, wherein the processor is configured to execute the set of instructions to cause the information sending apparatus to calculate the service index of the first terminal device based on iterations with a PageRank algorithm.

15. The apparatus of claim 14, wherein the processor is configured to execute the set of instructions to cause the information sending apparatus to:
   iterate for a number of times with the PageRank algorithm, if the number of times is preset; and
   iterate until all service indices of all terminal devices interacting with the first terminal device meet a preset convergence condition, if the number of times is not preset.

16. A non-transitory computer readable medium that stores a set of instructions that is executable by at least one processor of an information sending apparatus to cause the information sending apparatus to perform a method for sending information, the method comprising:
   calculating a weight of an interaction setting between a first terminal device and a second terminal device;
   calculating a relational score based on the weight between the first terminal device and the second terminal device, the second terminal device being one or more second terminal devices;
   calculating a service index of the first terminal device based on the relational score;
   determining information to send based on the service index; and
   sending the determined information to the first terminal device.

17. The computer readable medium according to claim 16, wherein calculating the weight of the interaction setting between the first terminal device and the second terminal device comprises calculating the weight of the interaction setting between the first terminal device and the second terminal device according to a logistic regression model.

18. The computer readable medium according to claim 17, wherein calculating the at least one relational score based on the weight among the first terminal device and the at least one second terminal device comprises:
   calculating, according to the logistic regression model, a first sum of a plurality of interaction scores corresponding to a plurality of interaction settings;
   multiplying the first sum by a time decay value of the first terminal device with respect to the second terminal device, to obtain a first total relational value of the first terminal device with respect to the second terminal device; and
   dividing the first total relational value by a second sum of second total relational values of the second terminal device with respect to terminal devices interacting with the second terminal device to obtain the relational score.

19. The computer readable medium according to claim 16, wherein calculating the service index of the first terminal device based on the relational score comprises calculating the service index of the first terminal device based on iterations with a PageRank algorithm.

20. The computer readable medium according to claim 19, wherein calculating the service index of the first terminal device based on the iterations with the PageRank algorithm comprises:
   iterating for a number of times with the PageRank algorithm, if the number of times is preset; and
   iterating until all service indices of all terminal devices interacting with the first terminal device meet a preset convergence condition, if the number of times is not preset.

* * * * *

UNITED STATES PATENT AND TRADEMARK OFFICE
CERTIFICATE OF CORRECTION

PATENT NO. : 10,447,792 B2
APPLICATION NO. : 15/073229
DATED : October 15, 2019
INVENTOR(S) : Huimei He et al.

It is certified that error appears in the above-identified patent and that said Letters Patent is hereby corrected as shown below:

On the Title Page

Item (30) Foreign Application Priority Data, "201510122749" should read as --201510122749.8--.

In the Claims

Claim 6, Column 9, Line 64, "deteii iine" should read as --determine--.

Signed and Sealed this
Twentieth Day of September, 2022

Katherine Kelly Vidal
*Director of the United States Patent and Trademark Office*